United States Patent
Kwon et al.

(10) Patent No.: US 10,476,088 B2
(45) Date of Patent: Nov. 12, 2019

(54) MANIFOLD DEVICE OF FUEL CELL STACK

(71) Applicant: Hyundai Motor Company, Seoul (KR)

(72) Inventors: Bu Kil Kwon, Gyeonggi-do (KR); Yong Gyu Noh, Gyeonggi-do (KR); Hyun Joon Lee, Gyeonggi-do (KR); Young Mo Goo, Chungcheongnam-do (KR); Seung Eul Yoo, Seoul (KR)

(73) Assignee: Hyundai Motor Company, Seoul (KR)

( * ) Notice: Subject to any disclaimer, the term of this patent is extended or adjusted under 35 U.S.C. 154(b) by 191 days.

(21) Appl. No.: 14/841,071

(22) Filed: Aug. 31, 2015

(65) Prior Publication Data

US 2016/0126569 A1    May 5, 2016

(30) Foreign Application Priority Data

Oct. 29, 2014 (KR) .................. 10-2014-0147886

(51) Int. Cl.
| | |
|---|---|
| H01M 8/04 | (2016.01) |
| H01M 8/24 | (2016.01) |
| H01M 8/04007 | (2016.01) |
| H01M 8/04089 | (2016.01) |
| H01M 8/2483 | (2016.01) |

(52) U.S. Cl.
CPC ... *H01M 8/04074* (2013.01); *H01M 8/04097* (2013.01); *H01M 8/2483* (2016.02); *H01M 2250/20* (2013.01); *Y02T 90/32* (2013.01)

(58) Field of Classification Search
CPC ......... H01M 8/04074; H01M 8/04097; H01M 8/2483; H01M 2250/20; H01M 8/04201; H01M 8/04007
See application file for complete search history.

(56) References Cited

U.S. PATENT DOCUMENTS

| | | | | |
|---|---|---|---|---|
| 4,769,297 A | * | 9/1988 | Reiser | H01M 8/04007 429/413 |
| 6,492,055 B1 | * | 12/2002 | Shimotori | H01M 8/0206 429/435 |
| 2003/0049506 A1 | * | 3/2003 | Yang | H01M 8/0258 429/439 |
| 2014/0087279 A1 | * | 3/2014 | Kiyohiro | H01M 8/04097 429/415 |
| 2015/0311553 A1 | * | 10/2015 | Dohkoshi | H01M 8/0631 429/410 |

(Continued)

FOREIGN PATENT DOCUMENTS

| | | |
|---|---|---|
| CN | 1567625 A | 1/2005 |
| CN | 1577929 A | 2/2005 |
| CN | 1599112 A | 3/2005 |

(Continued)

*Primary Examiner* — Maria Laios
*Assistant Examiner* — Angela J Martin
(74) *Attorney, Agent, or Firm* — Mintz Levin Cohn Ferris Glovsky and Popeo, P.C.; Peter F. Corless; Kongsik Kim (57) ABSTRACT

A manifold device of a fuel cell stack is provided which prevents moisture condensed in gases supplied to the fuel cell stack from excessively flowing into specific cells of the stack by heating gases supplied into the stack using heat of the stack. The manifold device also prevents flooding that is caused by liquid generated in cells disposed away from a gas inlet by removing a flow rate difference of gases generated in respective cells based on distances from the gas inlet of the stack.

12 Claims, 8 Drawing Sheets

(56) References Cited

U.S. PATENT DOCUMENTS

2016/0254557 A1* 9/2016 Finnerty ............... B01J 12/007
   429/423

FOREIGN PATENT DOCUMENTS

| | | | | |
|---|---|---|---|---|
| CN | 102062842 | A | 5/2011 | |
| JP | 2006-108027 | A | 4/2006 | |
| JP | 2007-026856 | * | 2/2007 | ............. H01M 8/24 |
| JP | 2007-026856 | A | 2/2007 | |
| JP | 2007-115460 | A | 5/2007 | |
| JP | 2013-016401 | * | 1/2013 | ............. H01M 8/04 |
| JP | 2013-016401 | A | 1/2013 | |
| JP | 2013-251178 | A | 12/2013 | |
| KR | 2008-0034192 | A | 4/2008 | |

* cited by examiner

RELATED ART

FIG.8

RELATED ART

MANIFOLD DEVICE OF FUEL CELL STACK

CROSS-REFERENCE TO RELATED APPLICATION

This application claims under 35 U.S.C. § 119(a) the benefit of Korean Patent Application No. 10-2014-0147886 filed Oct. 29, 2014, the entire contents of which are incorporated herein by reference.

BACKGROUND (a) Technical Field

The present invention relates to a manifold device of a fuel cell stack, and more particularly, to a manifold device of a fuel cell stack, which prevents flooding due to liquid by increasing the temperature of gases supplied into a stack using stack heat and thus completely vaporizing liquid included in gases.

(b) Background Art

Generally, hydrogen is supplied to the anode of a fuel cell stack as a fuel. For improvement of hydrogen utilization rate or reaction performance of the fuel cell stack, in the anode, an anode off gas that is discharged from the stack is recirculated into the fuel cell stack again. In particular, the anode off gas is mixed with hydrogen newly supplied from a fuel tank, and then is supplied into the stack. Hydrogen newly supplied from the fuel tank is hydrogen of an ordinary temperature (e.g., atmospheric temperature), which is in cold and dry (e.g., relative humidity ~%) state. Additionally, the anode off gas discharged from the stack is of a substantially high temperature and humid gas which is heated to the operation temperature of the stack and is humidified by moisture back-diffused in the cathode. Accordingly, the mixed gas (e.g., newly supplied hydrogen+anode off gas) decreases in temperature compared to the anode off gas, and thus a substantial amount of liquid water is generated in the mixed gas.

Further, the gas introduced into the stack is mixed with newly supplied hydrogen and recirculating hydrogen by a recirculation apparatus such as an ejector or a blower, and then is supplied to the stack. In particular, the suction force of the ejector or the blower may also cause liquid discharged from the outlet of the stack to recirculate and flow into the inlet of the stack. Particularly in winter (e.g., colder weather months), since the temperature of the fuel tank is substantially low, the inflow of such liquid may cause substantial performance reduction (e.g., voltage drop of specific cells) of the stack.

Figure 7:
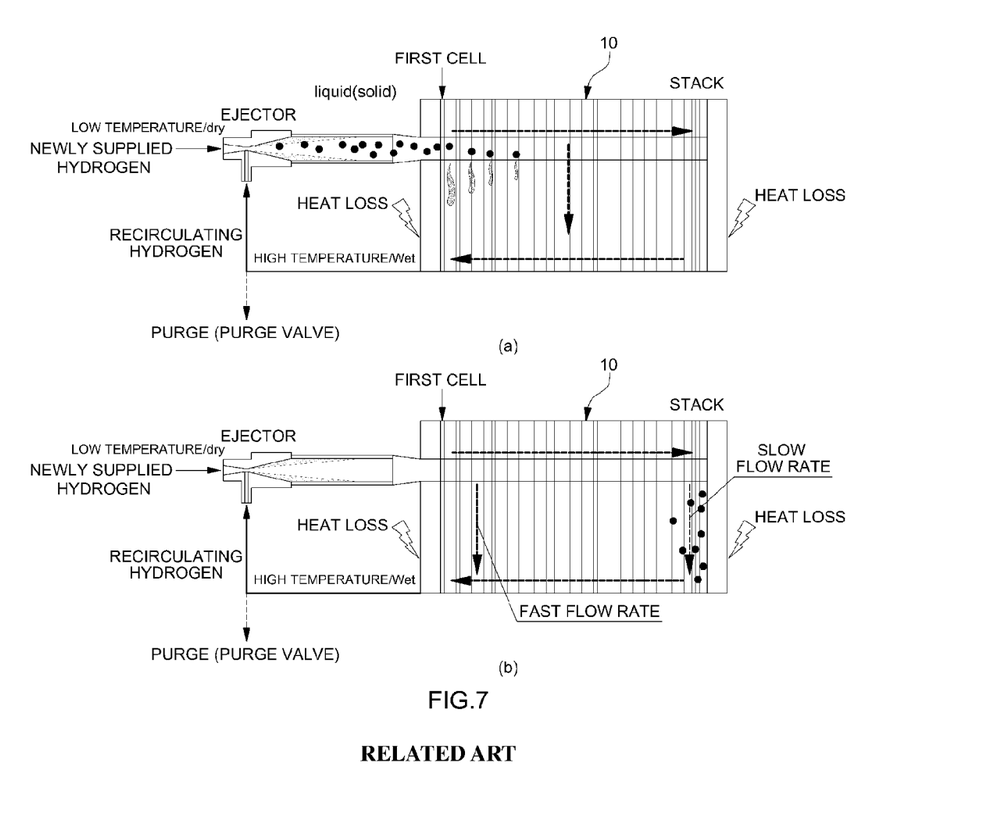
FIGS. 7 and 8 are exemplary schematic views illustrating limitations of a typical fuel cell stack according to the related art.

More specifically, referring to FIG. 7, when water in liquid state flows into a fuel cell stack 10, liquid is introduced into cells disposed at the inlet of the fuel cell stack 10, and thus partial clogging may occur on anode channels of cells disposed at the side of the inlet, causing anode flooding and rapid reduction of the voltage (performance) of the cells at the side of the inlet.

Additionally, as shown in FIG. 7, when the inlet and the outlet of the anode are disposed at one side of the stack 10, there occurs a substantial flow rate difference (differential pressure) between a cell adjacent to the inlet and the outlet and a cell distant from the inlet and the outlet. In other words, cells adjacent to the inlet and the outlet have a rapid flow rate due to a shorter recirculation path, whereas cells distant (e.g., at a predetermined distance from) from the inlet and the outlet have a slower flow rate due to a longer recirculation path. Accordingly, when there is minimal liquid flowing into cells adjacent to the inlet and the outlet, water may be discharged at a rapid flow rate. However, for the cells distant from the inlet and the outlet, since liquid water in the anode channel is not substantially discharged, anode flooding may be caused. Additionally, since there is a heat loss in an end plate of the stack, excessive liquid exists in cells disposed at both ends of the stack compared to other cells. Accordingly, since more liquid exists in cells distant from the inlet and the outlet than cells inside the stack, it is more disadvantageous for cells distant from the inlet and the outlet to discharge liquid.

Furthermore, since cells distant from the inlet and the outlet are relatively low in hydrogen concentration compared to cells adjacent to the inlet and the outlet, the hydrogen concentration is non-uniformly distributed on respective cells. When water flowing into the anode channel of each cell is not substantially discharged, a catalyst or a catalyst support is permanently damaged. Generally, water accumulated in cells may be discharged by opening a purge valve of the anode and thus instantaneously increasing the flow rate of circulating gas, but in this case, a loss of a fuel is incurred. Typically, flooding in the cathode of the stack may be removed by increasing the supply amount of air.

The above information disclosed in this section is merely for enhancement of understanding of the background of the invention and therefore it may contain information that does not form the prior art that is already known in this country to a person of ordinary skill in the art.

SUMMARY

The present invention provides a manifold device of a fuel cell stack, which may prevent moisture (e.g., liquid) condensed in gases supplied to the fuel cell stack from excessively flowing into specific cells of the stack, and may prevent flooding caused by liquid generated in cells disposed away from a gas inlet by removing a flow rate difference of gases generated in respective cells based on distances from the gas inlet of the stack.

In one aspect, the present invention provides a manifold device of a fuel cell stack that may include: a gas supply path configured to supply a gas into a fuel cell stack including a plurality of cells stacked in a line (e.g., linearly) therein; and a gas discharge path configured to discharge the gas from the fuel cell stack, wherein the gas supply path may include a gas heating part configured to heat the gas supplied into the fuel cell stack using heat of the fuel cell stack and vaporize liquid contained in the gas and a gas supply part configured to supply the gas flowing from the gas heating part to each cell of the fuel cell stack.

In an exemplary embodiment, the gas heating part may extend linearly (e.g., along a straight line) forward and backward at a bottom of the fuel cell stack, and then extend linearly upward from a rear end of the bottom of the fuel cell stack, integrally connecting to a rear end of the gas supply part disposed at a top of the fuel cell stack. In particular, the gas heating part may be disposed at either a left or a right side of the bottom of the fuel cell stack, facing the gas discharge path disposed at the other side of the bottom of the fuel cell stack.

In another exemplary embodiment, the gas heating part may extend linearly forward and backward at a top of the fuel cell stack, and then extend linearly left and right from a rear end of the top of the fuel cell stack, integrally connecting to a rear end of the gas supply part disposed at the top of the fuel cell stack. In particular, the gas heating part may be disposed at either a left or a right side of the top of the fuel cell stack, and thus may be disposed over the gas discharge path disposed at the same side of the bottom of the fuel cell stack as the gas heating part.

In still another exemplary embodiment, the gas heating part may extend linearly forward and backward at a bottom of the fuel cell stack, and then extend diagonally at a rear end of the bottom of the fuel cell stack, integrally connecting to a rear end of the gas supply part disposed at a top of the fuel cell stack. In particular, the gas heating part may extend linearly forward and backward at a bottom of the fuel cell stack, and then extend linearly left and right from a rear end of the bottom of the fuel cell stack and again extend upward, integrally connecting to a rear end of the gas supply part disposed at a top of the fuel cell stack.

In yet another exemplary embodiment, the gas heating part may extend linearly forward and backward at a bottom of the fuel cell stack, and then extend upward from a rear end of the bottom of the fuel cell stack and again extends left and right, integrally connecting to a rear end of the gas supply part disposed at a top of the fuel cell stack. In particular, the gas heating part may be disposed at either left or right side of the bottom of the fuel cell stack, and thus may be disposed over the gas discharge path disposed at the same side of the bottom of the fuel cell stack as the gas heating part.

In still yet another exemplary embodiment, the gas discharge path may extend linearly forward and backward at either left or right of the fuel cell stack, and the gas supply part of the gas supply path may extend forward and backward at an opposite side of the fuel cell stack to the gas discharge path, connecting to a gas channel disposed in each cell to allow the gas to flow therein. In particular, the gas channel may be an anode channel of each cell constituting the fuel cell stack, or the gas channel may be a cathode channel of each cell constituting the fuel cell stack.

In a further exemplary embodiment, in the fuel cell stack, each cell may have about the same traveling distance of the gas while the gas heated by the gas heating part is supplied into each cell via the gas supply part and then may be discharged from the fuel cell stack through the gas discharge path.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

100: fuel cell stack
110: end plate
112: close end plate
120: cell
122: anode channel
130,160,180,210,230: gas supply path
132,162,182,212,232: gas heating part
134,164,184,214,234: gas supply part
140,170,190,220,240: gas discharge path
150,152,156: ejector It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
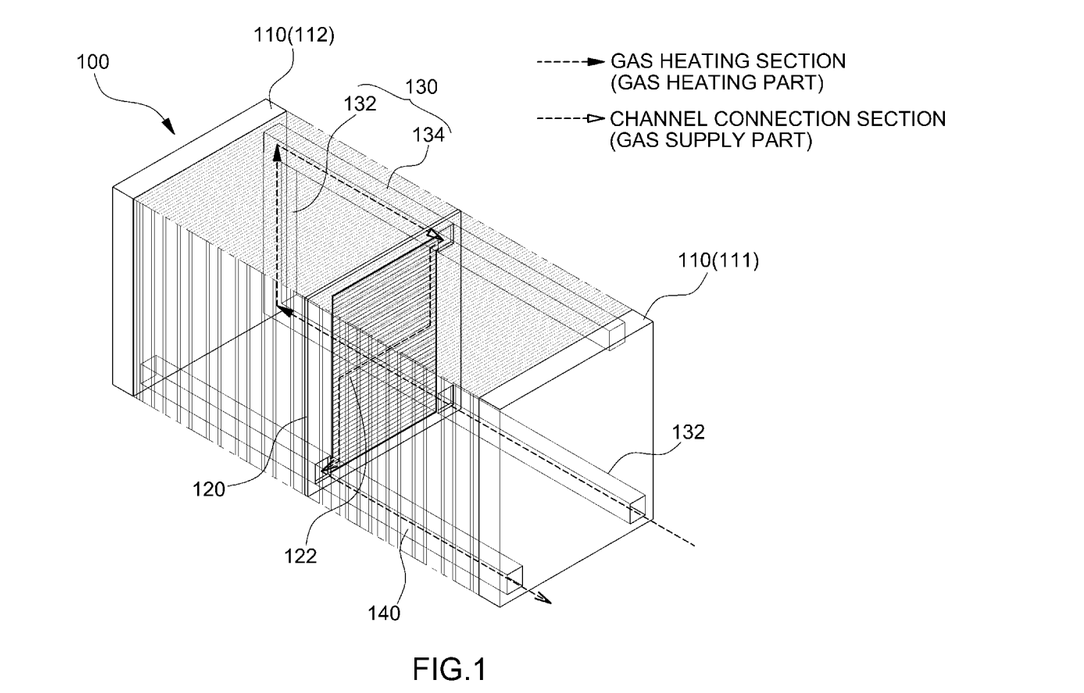
FIGS. 1 and 2 are exemplary schematic views illustrating a fuel cell stack having a manifold structure according to a first exemplary embodiment of the present invention.

Hereinafter, exemplary embodiments of the present invention will be described in detail with reference to the accompanying drawings so that those skilled in the art can easily carry out the present invention. First, a first exemplary embodiment of the present invention will be described in detail with reference to FIG. 1. FIG. 1 is an exemplary schematic view illustrating a fuel cell stack having a manifold structure according to an exemplary first embodiment of the present invention, which shows a part (e.g., gas supply path, gas discharge path, and gas channel) in which a hydrogen gas may flow within the stack, to describe the movement path of a gas (e.g., hydrogen) supplied into the stack. FIG. 1 shows only one of a plurality of cells constituting the stack.

As shown in FIG. 1, a fuel cell stack 100 according to an exemplary embodiment of the present invention may include a plurality of cells 120 stacked in a line between end plates 110 disposed at both forward and backward sides of the fuel cell stack 100. The fuel cell stack 100 may include a manifold structure that includes a gas supply path 130 configured to move a gas supplied into the fuel cell stack 100 and a gas discharge path 140 configured to discharge the gas from the fuel cell stack 100.

In particular, the gas supplied into the fuel cell stack 100 may be a hydrogen gas (or a mixed gas of newly supplied hydrogen and anode off gas) containing liquid (e.g., condensate water), and the gas supply path 130 and the gas discharge path 140 may be connected to an anode channel 122 of each cells 120 inside the fuel cell stack 100. In this disclosure, the manifold structure is described as a manifold connected to the anode channel 122 of the fuel cell stack 100, but the manifold structure disclosed herein may also be similarly applied to the cathode of the fuel cell stack 100. Accordingly, when the manifold structure disclosed herein is similarly applied to the cathode of the fuel cell stack 100, a gas supplied into the fuel cell stack 100 may be air that contains liquid, and the gas supply path 130 and the gas discharge path 140 may be connected to the cathode channel of the fuel cell stack 100.

In FIG. 1, the gas supply path 130 may include a gas heat part 132 at the front end portion thereof and a gas supply part 134 at the rear end portion thereof. The gas heat part 132 may be configured to vaporize liquid within the mixed gas by increasing the temperature of the mixed gas (e.g., hydrogen gas) flowing therein using heat of the fuel cell stack 100. The gas supply part 134 may be configured supply the mixed gas from the gas heating part 132 to each cell 120 of the fuel cell stack 100. The gas supply path 130 and the gas discharge path 140, which are parts in which the gas flowing into the fuel cell stack 100 flows, may be connected to a plurality of anode channels 122 disposed in each cell 120 of the fuel cell stack 100, enabling the gas to move therein. FIG. 1 shows only one anode channel of one cell disposed in about the center of the plurality of cells within the stack.

Since the temperature of the mixed gas flowing into the fuel cell stack 100 through the gas supply path 130 increases to the temperature of the fuel cell stack 100 by heat inside the fuel cell stack 100 while the mixed gas is flowing to a cell (e.g., close end plate 112) disposed at the end of the fuel cell stack 100 along the gas heating part 132, liquid contained in the mixed gas may be completely vaporized. Particularly, since the gas heating part may not be connected to the anode channel 122 of the cell 120 inside the fuel cell stack 100, gas movement may not occur between the gas heating part 132 and the anode channel 122.

Thereafter, the mixed gas may first be supplied into a cell disposed at the end of the fuel cell stack 100 through the gas supply part 134, and may flow into the anode channel 122 connected to the gas supply part 134. The mixed gas flowing into the anode channel 122 may flow into the gas discharge path 140 while moving along the anode channel 122, and then may be discharged from the fuel cell stack 100 through the gas discharge path 140. In particular, when the mixed gas having increased temperature is supplied into the respective cells 120 of the stack 100, the total traveling distance of the mixed gas may be equal with respect to each cell while the mixed gas flows into each cell 120 of the fuel cell stack 100 through the gas supply part 134 and then may be discharged from the fuel cell stack 100 through the gas discharge path 140. In other words, regardless of the distances of the cells 120 from the gas inlet and outlet of the fuel cell stack 100, the total traveling distance of the mixed gas may be equal with respect to each cell while the mixed gas flows into each cell 120 of the fuel cell stack 100 through the gas supply part 134 and then may be discharged from the fuel cell stack 100 through the gas discharge path 140.

In FIG. 1, the gas heating part 132 may extend linearly (e.g., in a substantially straight line) forward and backward at the bottom of the fuel cell stack 100, and then may extend linearly upward (e.g., substantially straight vertical line) from the rear end of the bottom of the fuel cell stack 100, integrally connecting to the rear end of the gas supply part 134 disposed at the top of the fuel cell stack 100. The gas heating part 132 may be disposed at either a left or a right side of the bottom of the fuel cell stack 100, facing the gas discharge path 140 disposed at the other side of the bottom of the fuel cell stack 100. In other words, when the gas heating part 132 is disposed at a left side of the bottom of the fuel cell stack 100, the gas discharge path 140 is disposed at a right side of the bottom of the fuel cell stack 100, or vice versa.

Additionally, the gas supply part 134 may extend linearly forward and backward at the top of the fuel cell stack 100, and may be connected to the gas channel (e.g. anode channel 122) disposed in each cell 120 of the fuel cell stack 100, enabling the gas to flow therein. In other exemplary embodiments described below, the gas supply part 134 may be configured in the same form. Particularly, the gas channel may signify the anode channel 122 of each cell 120 constituting the fuel cell stack 100, but may also signify a cathode channel when the manifold structure is applied to the cathode of the fuel cell stack 100.

In the manifold structure of the fuel cell stack 100, the mixed gas may flow to an end cell of the fuel cell stack 100 by the initial flow of the gas flowing into the gas supply path 130. Since the temperature of the mixed gas may increase to the temperature of the fuel cell stack 100, the liquid inside the mixed gas may be vaporized. Thereafter, the mixed gas may be first supplied to the end cell of the fuel cell stack 100, and in this case, there no flow rate difference may occur based on the distances from the gas inlet and outlet of the fuel cell stack 100. Regardless of the distances from the gas inlet and outlet of the fuel cell stack 100, most cells may have about the same gas traveling distance. Thus, the removal of the distance difference between cells may uniformalize the hydrogen concentration between the respective cells.

Figure 2:
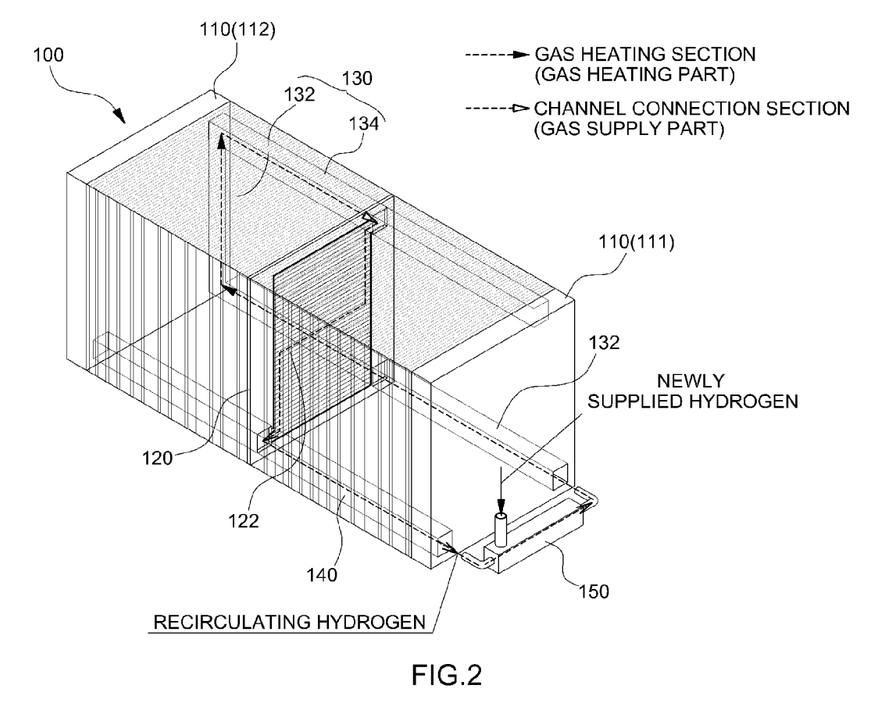
Figure 8:
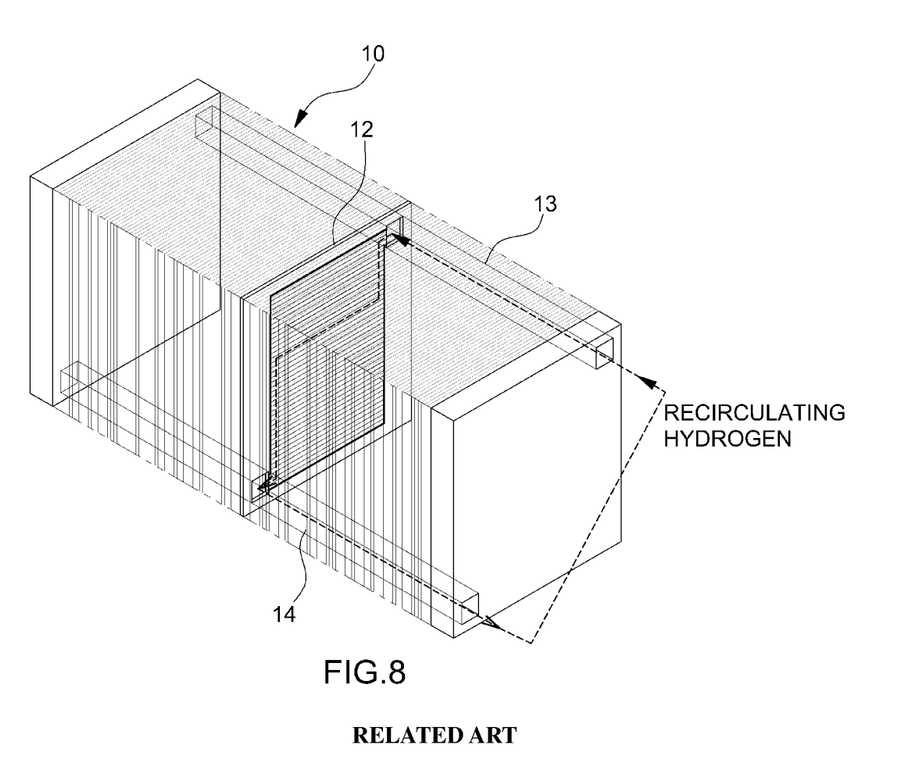

Particularly, the gas supply path 130 and the gas discharge path 140 may be disposed outside the gas channel (anode channel 122) of each cell 120. Generally, in the fuel cell stack 100, the gas supply path 13 may be disposed over the cell 12 (e.g., above) and the gas discharge path 14 may be disposed under the cell 12 (e.g. below), to more easily discharge moisture generated in the gas channels (e.g., anode channel and cathode channel) of each cell. Accordingly, a gas introduced into and then discharged from each cell 12 may flow from the upper side to the lower side of the cell 12. In a related art, a recirculating gas (e.g., anode off gas) discharged from a fuel cell stack 10 flows diagonally thus, forming a path (flow) that is resupplied into the stack 10 (see FIG. 8). When the gas supply path 130 and the gas discharge path 140 are configured as described by referring to FIG. 1, since the straight flow of the recirculating gas as shown in FIG. 2 may be formed by an ejector 150, there is an advantage in terms of package of a vehicle (e.g., size of the system).

Figure 3:
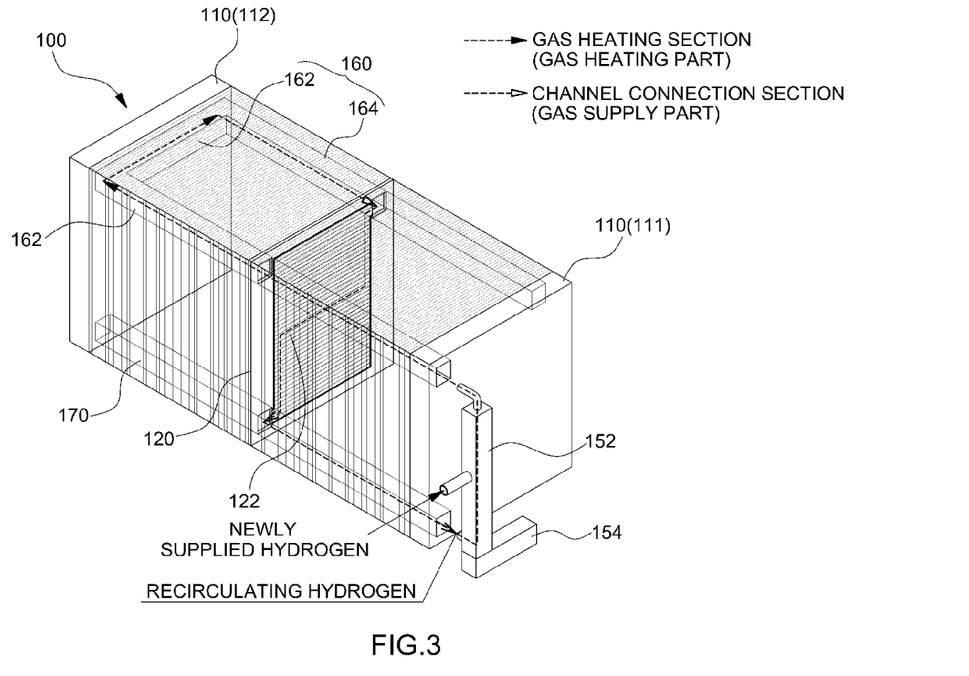
FIG. 3 is an exemplary schematic view illustrating a fuel cell stack having a manifold structure according to a second exemplary embodiment of the present invention.
Figure 4:
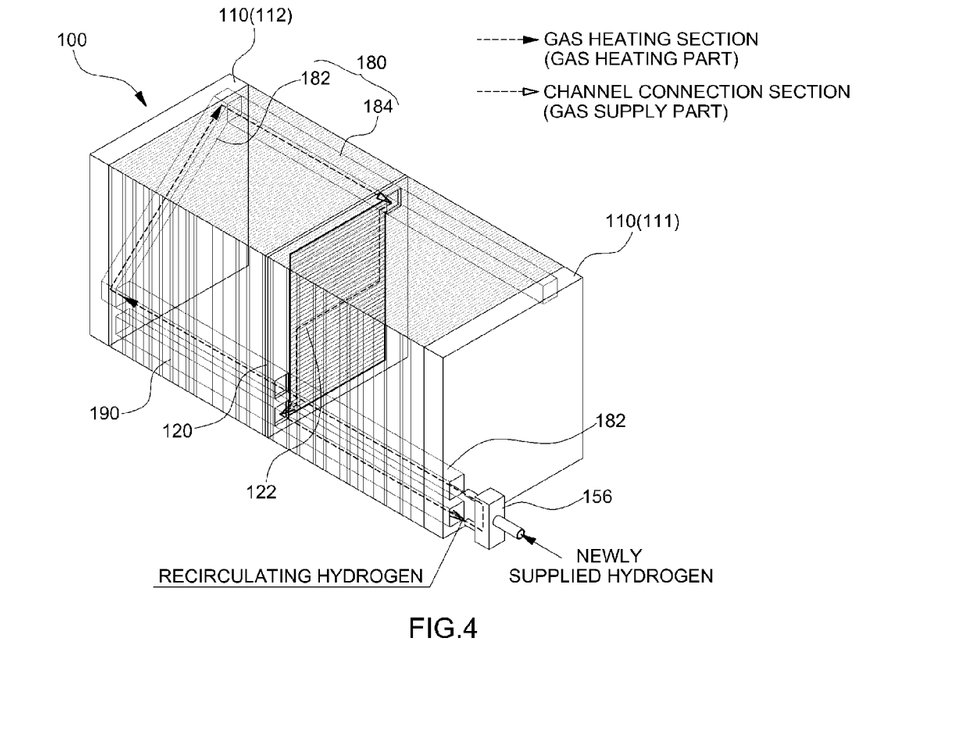
FIG. 4 is an exemplary schematic view illustrating a fuel cell stack having a manifold structure according to a third exemplary embodiment of the present invention.
Figure 5:
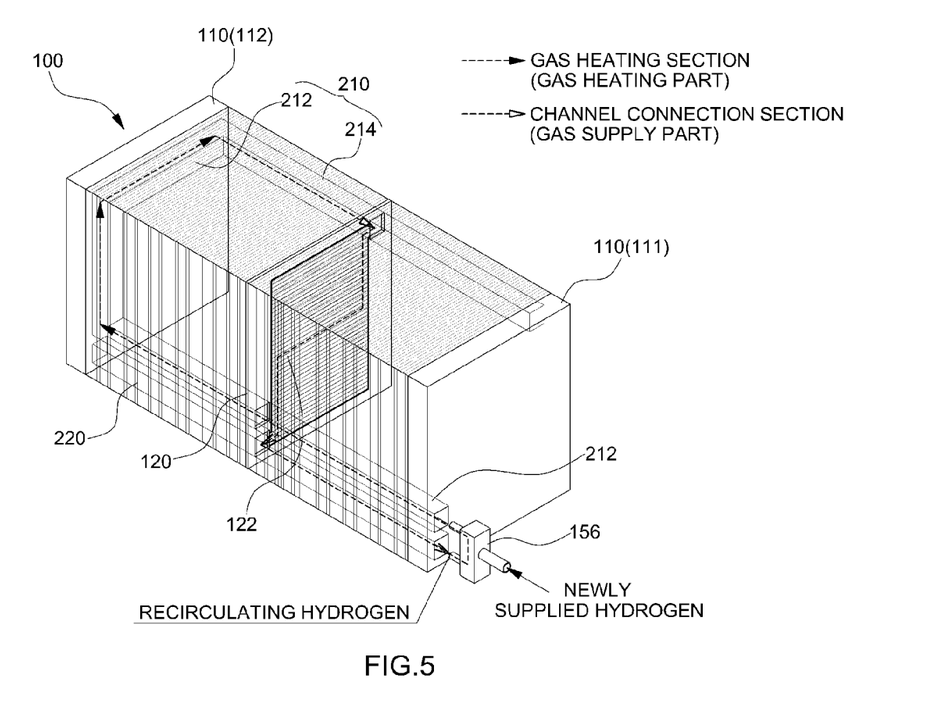
FIG. 5 is an exemplary schematic view illustrating a fuel cell stack having a manifold structure according to a fourth exemplary embodiment of the present invention.
Figure 6:
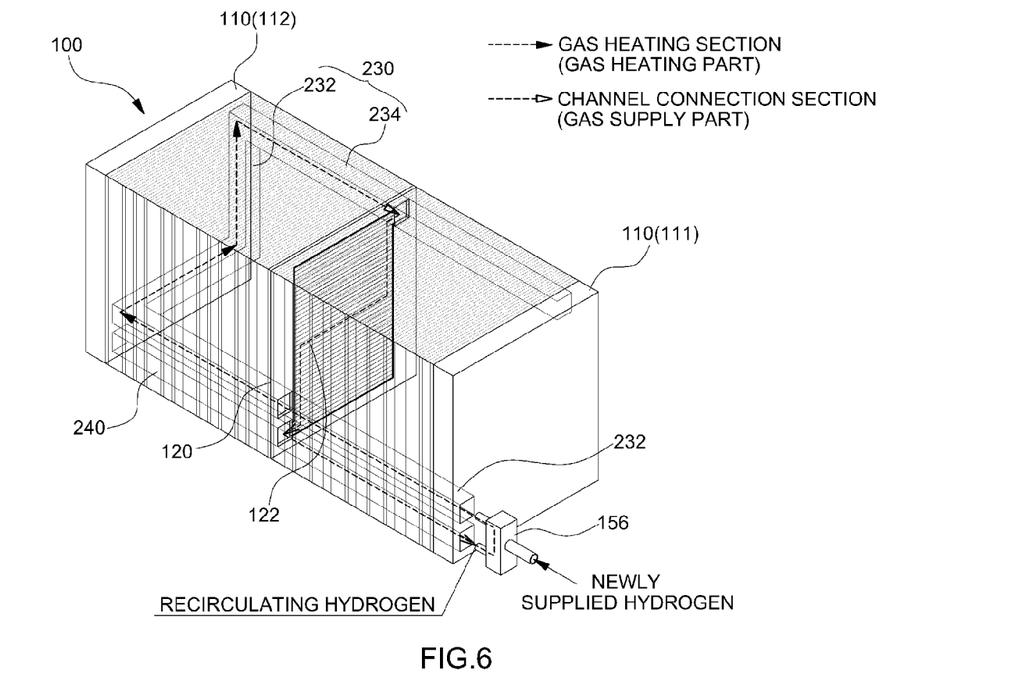
FIG. 6 is an exemplary schematic view illustrating a fuel cell stack having a manifold structure according to a fifth exemplary embodiment of the present invention.

Meanwhile, FIG. 3 is an exemplary schematic view illustrating a fuel cell stack having a manifold structure according to a second exemplary embodiment of the present invention. FIG. 4 is an exemplary schematic view illustrating a fuel cell stack having a manifold structure according to a third exemplary embodiment of the present invention. FIG. 5 is an exemplary schematic view illustrating a fuel cell stack having a manifold structure according to an exemplary fourth embodiment of the present invention. FIG. 6 is an exemplary schematic view illustrating a fuel cell stack having a manifold structure according to a fifth exemplary embodiment of the present invention. The drawings show parts (e.g., gas supply path, gas discharge path, and gas channel) in which a hydrogen gas flows in the stack, to describe the traveling path of a gas (e.g., hydrogen) supplied into the stack. The drawings show only one of a plurality of cells constituting the stack.

In FIG. 3, a gas heating part 162 may extend linearly forward and backward (or forward or backward) at the top of the fuel cell stack 100, and then may extend linearly left and right (or left or right) from the rear end of the top of the fuel cell stack 100, integrally connecting to the rear end of a gas supply part 164 disposed at the top of the fuel cell stack 100. Particularly, the gas heating part 162 may be disposed at either a left or a right side of the top of the fuel cell stack 100, and thus may be disposed over a gas discharge path 170 disposed at the same side of the bottom of the fuel cell stack 100 as the gas heating part 162. Accordingly, a recirculating gas (e.g., anode off gas) discharged from the gas discharge path 170 may flow upward at either left or right side of the fuel cell stack 100. An ejector 152 may be vertically disposed, and may include a water trap disposed thereunder and may be configured to collect an excessive amount of liquid. Alternatively, the ejector 152d may include a purge valve (or discharge valve) disposed thereunder and may be configured to purge a mixed gas discharged from the fuel cell stack 100.

In FIG. 4, the gas heating part 182 may extend linearly forward and backward at the bottom of the fuel cell stack 100, and then may extend diagonally at the rear end of the bottom of the fuel cell stack 100, integrally connecting to the rear end of a gas supply part 180 disposed at the top of the fuel cell stack 100. The diagonal path of the gas heating part 182 disposed at the rear end of the fuel cell stack 100 may be prepared in a groove form such as straight-line type or streamlined type on the inner wall surface of a close end plate 112 of the fuel cell stack 100 (e.g., an adjacent end plate 112).

In particular, the gas heating part 182 may be disposed at either a left or a right side of the bottom of the fuel cell stack 100, and thus may be disposed over a gas discharge path 190 disposed at the same side of the bottom of the fuel cell stack 100 as the gas heating part 182. Accordingly, a recirculating gas discharged from the gas discharge path 190 may flow upward by a shortest distance at either the left or the right side of the fuel cell stack 100. An ejector 156 may be configured such that a portion of the ejector 156 may be inserted into the inlet of the gas supply path (or gas heating part) 180, and may also be disposed extraneous to the fuel cell stack 100. In particular, the ejector 156 may be used to more efficiently utilize a space in terms of package of a vehicle (e.g., may be more efficiently disposed within the vehicle to thus take up minimal space).

In FIG. 5, the gas heating part 212 may extend linearly forward and backward at the bottom of the fuel cell stack 100, and then may extend upward (e.g., vertically) at the rear end of the bottom of the fuel cell stack 100 and again extend left and right, integrally connecting to the rear end of a gas supply part 214 disposed at the top of the fuel cell stack 100. Similarly to the exemplary embodiment of FIG. 4, the gas heating part 212 may be disposed at either a left or a right side of the bottom of the fuel cell stack 100, and thus may be disposed over a gas discharge path 220 disposed at the same side of the bottom of the fuel cell stack 100 as the gas heating part 212. Accordingly, a recirculating gas discharged from the gas discharge path 220 may flow upward by the shortest distance at either the left or the right side of the fuel cell stack 100.

In FIG. 6, a gas heating part 232 may extend linearly forward and backward (or forward or backward) at the bottom of the fuel cell stack 100, and then may extend linearly left and right (or left or right) from the rear end of the top of the fuel cell stack 100 and again extend upward, integrally connecting to the rear end of a gas supply part 234 disposed at the top of the fuel cell stack 100.

Similarly to the exemplary embodiments of FIGS. 4 and 5, the gas heating part 232 may be disposed at either a left or a right side of the bottom of the fuel cell stack 100, and thus may be disposed over a gas discharge path 240 disposed at the same side of the bottom of the fuel cell stack 100 as the gas heating part 232. Accordingly, a recirculating gas discharged from the gas discharge path 240 may flow upward by the shortest distance at either a left or a right side of the fuel cell stack 100.

As shown in FIGS. 1 to 6, the gas discharge paths 140, 170, 190, 220 and 240 may extend forward and backward at either a left or a right side of the bottom of the fuel cell stack 100, and the gas supply paths 134, 164, 184, 214 and 234 may extend forward and backward (e.g., horizontally) at the opposite side of the top of the fuel cell stack 100 to the gas discharge paths 140, 170, 190, 220 and 240, respectively.

In the manifold structures of the fuel cell stack 100, since the traveling path of the gases supplied into the fuel cell stack 100, the liquid contained in the gases supplied into the fuel cells stack 100 may be vaporized by absorbing heat generated in the fuel cell stack 100. When gases, liquid of which is completed vaporized, are supplied to each cell constituting the fuel cell stack 100, the gases may have about the same traveling distance while moving from the rear end of the gas supply parts 134, 164, 184, 214 and 234 to the outlets of the gas discharge paths 140, 170, 190, 220 and 240 via the gas channel 122 within the cell 120.

Meanwhile, as described above, the manifold structure of the fuel cell stack 100 may be similarly applied to the cathode of the fuel cell stack 100. A manifold device of a fuel cell stack according to an exemplary embodiment of the present invention, which may be an anode (or cathode)

manifold structure for uniformalizing the supply conditions of a fuel (or air) supplied to respective cells of the fuel cell stack, has the following advantages. That is, the anode or cathode manifold structure may cause the supply conditions of the fuel to be supplied more uniformly to the respective cells of the fuel cell stack.

1. Since the flow path of mixed gas (e.g., anode off gas+newly supplied hydrogen) supplied to the anode of a stack may be changed (e.g., increased) to completely vaporize the liquid while passing the corresponding path and supply the mixed gas to the stack, moisture may not be excessively introduced into specific cells.

2. Since a flow rate difference between respective cells may be minimized by allowing the cells to have a symmetrical flow pattern regardless of distances from the inlet and the outlet of a gas (e.g., hydrogen or air) supplied to the stack, anode flooding in specific cells due to the flow rate difference may be effectively prevented. Additionally, the removal of the distance difference may uniformalize the hydrogen concentration between the respective cells, and may improve the moisture discharge characteristics of cells distant from the inlet and the outlet of the stack.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A manifold device of a fuel cell stack, comprising:
   a gas inlet and a gas outlet disposed at one end of the fuel cell stack;
   a gas supply path configured to supply a gas into the fuel cell stack having a plurality of cells stacked therein; and
   a gas discharge path configured to discharge the gas from the fuel cell stack and disposed apart from the gas supply path,
   wherein the gas supply path includes a gas heating part disposed in the fuel cell stack to heat the gas supplied into the fuel cell stack using heat of the fuel cell stack and vaporize liquid contained in the gas and a gas supply part configured to supply the gas flowing from the gas heating part to each cell of the fuel cell stack,
   wherein the gas heating part is not connected to gas channels of the plurality of cells and extends from the one end of the fuel cell stack to an opposite end of the fuel cell stack in a stacking direction,
   wherein the gas supply part and the gas discharge path are connected with each other by the gas channels of the plurality of cells and both of the gas supply part and the gas discharge path extend from the opposite end of the fuel cell stack to the one end of the fuel cell stack in a stacking direction,
   wherein the gas supplied from the gas inlet flows through the gas heating part in a first direction, the gas supplied into the gas supply part from the gas heating part flows through the gas supply part in a second direction opposite to the first direction and the gas supplied into the gas discharge path flows through the gas discharge path in the second direction, and
   wherein each of the gas channels of the plurality of cells is connected between the gas supply part and the gas discharge path such that each cell has about the same traveling distance of the gas.

2. The manifold device of claim 1, wherein the gas heating part extends linearly forward and backward at a bottom of the fuel cell stack, and then extends upward from a rear end of the bottom of the fuel cell stack, integrally connecting to a rear end of the gas supply part disposed at a top of the fuel cell stack.

3. The manifold device of claim 2, wherein the gas heating part is disposed at either a left or a right side of the bottom of the fuel cell stack, facing the gas discharge path disposed at the other side of the bottom of the fuel cell stack.

4. The manifold device of claim 1, wherein the gas heating part extends linearly forward and backward at a top of the fuel cell stack, and then extends straightly left and right from a rear end of the top of the fuel cell stack, integrally connecting to a rear end of the gas supply part disposed at the top of the fuel cell stack.

5. The manifold device of claim 4, wherein the gas heating part is disposed at either the left or the right side of the top of the fuel cell stack to be disposed over the gas discharge path disposed at the same side of the bottom of the fuel cell stack as the gas heating part.

6. The manifold device of claim 1, wherein the gas heating part extends linearly forward and backward at a bottom of the fuel cell stack, and then extends diagonally at a rear end of the bottom of the fuel cell stack, integrally connecting to a rear end of the gas supply part disposed at a top of the fuel cell stack.

7. The manifold device of claim 1, wherein the gas heating part extends linearly forward and backward at a bottom of the fuel cell stack, and then extends linearly left and right from a rear end of the bottom of the fuel cell stack and again extends upward, integrally connecting to a rear end of the gas supply part disposed at a top of the fuel cell stack.

8. The manifold device of claim 1, wherein the gas heating part extends linearly forward and backward at a bottom of the fuel cell stack, and then extends upward from a rear end of the bottom of the fuel cell stack and again extends left and right, integrally connecting to a rear end of the gas supply part disposed at a top of the fuel cell stack.

9. The manifold device of claim 8, wherein the gas heating part is disposed at either a left or a right side of the bottom of the fuel cell stack to be disposed over the gas discharge path disposed at a same side of the bottom of the fuel cell stack as the gas heating part.

10. The manifold device of claim 1, wherein the gas discharge path extends linearly forward and backward at either a left or a right of the fuel cell stack, and the gas supply part of the gas supply path extends forward and backward at an opposite side of the fuel cell stack to the gas discharge path.

11. The manifold device of claim 1, wherein the gas channel is an anode channel of each cell constituting the fuel cell stack.

12. The manifold device of claim 1, wherein the gas channel is a cathode channel of each cell constituting the fuel cell stack.

* * * * *